United States Patent [19]
Perron

[11] 3,746,985
[45] July 17, 1973

[54] COMBINED DIGITAL DISPLAY SPEEDOMETER AND LOG

[75] Inventor: Robert R. Perron, Beverly, Mass.

[73] Assignee: The Eastern Company, Naugatuck, Conn.

[22] Filed: Aug. 25, 1971

[21] Appl. No.: 174,777

[52] U.S. Cl................. 324/166, 324/163, 324/171, 73/181
[51] Int. Cl. ............................................. G01p 3/48
[58] Field of Search.................... 324/161, 163, 164, 324/165, 166, 168, 171, 173, 174, 175; 235/92 DN; 73/181–187

[56] References Cited
UNITED STATES PATENTS

| | | |
|---|---|---|
| 3,604,260 | 9/1971 | Ogg........................................ 73/181 |
| 3,614,617 | 10/1971 | Blake................................. 324/166 |
| 3,287,969 | 11/1966 | Hardy................................. 324/171 |
| 3,425,280 | 2/1969 | Foster................................. 73/185 |

Primary Examiner—Michael J. Lynch
Attorney—Carl Hoppe et al.

[57] ABSTRACT

A combined log and speedometer having a digital readout is provided wherein an electronic speed sensor actuates a voltage controlled oscillator so that the frequency of the oscillator is proportional to speed. The output pulses are counted and accumulated to give an indication of the distance traveled and simultaneously the output pulses are sampled for precise periods of time to give an indication of speed. Both speed and distance are displayed digitally.

2 Claims, 3 Drawing Figures

INVENTOR.
ROBERT R. PERRON

INVENTOR.
ROBERT R. PERRON

3,746,985

COMBINED DIGITAL DISPLAY SPEEDOMETER AND LOG

SUMMARY OF THE INVENTION

In a co-pending application Serial No. 151,371 filed 6-9-71, the present inventor and Walter J. Greene disclosed and claimed a digital display distance log wherein the voltage output of a speed sensor is converted to a frequency which is proportional to the speed. The frequency pulses are then counted and suitably divided and displayed to indicate the distance traveled.

It is obvious that in such a device, the frequency is proportional to the speed so that it is only necessary to count the pulses for some fixed interval and to display the count for said interval to indicate the speed. In any such instrument, the principal difficulty, and thus the principal expense of the finished instrument, is in providing a voltage-to-frequency converter which is absolutely linear. In accordance with the present invention, a system is provided wherein a single voltage-to-frequency converter is employed for both distance and speed. Further, only a single digital readout is required although separate readouts may be provided. Thus, a combined instrument which indicates both speed and distance is provided which is only slightly more expensive than a single instrument which would indicate only speed or distance.

In said co-pending patent application a transducer and voltage controlled oscillator are employed having a voltage output of from 5 to 10 volts which produces a pulse train of from 0 to 1,364 pulses per second. This pulse train can be divided by 40960 by digital counters so that each pulse correspond to 1/10th of a nautical mile.

In accordance with the present invention, the frequency of the converter is sampled for a period of 0.88 seconds so that a count of 1,200 is obtained during said sampling period, representing a speed of 12 knots. It will be understood, of course, that the particular frequency selected and sampling rates are only matters of convenience and that other values might be chosen without departing from the spirit of this invention.

DESCRIPTION OF THE PREFERRED EMBODIMENT

Figure 1:
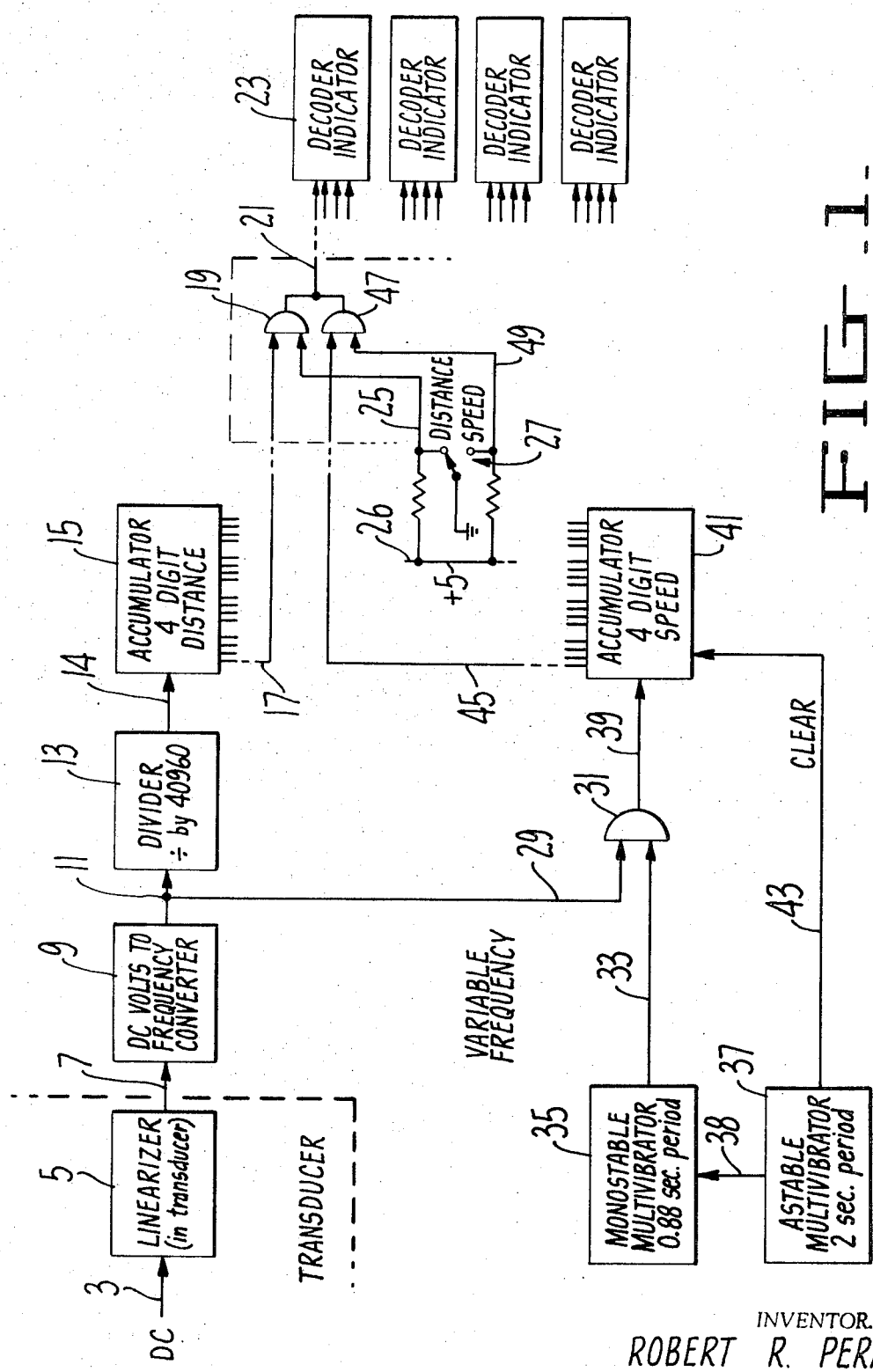
FIG. 1 is a block diagram of a preferred embodiment of the invention.

A D.C. voltage is developed by a speed sensor, not shown, in line 3. If this voltage is not directly proportional to the speed, it may be passed through a linearizer 5. This forms no part of the present invention and suffice it to say that a voltage appears at 7 which is directly proportional to the speed at which a vessel is traveling. In the particular embodiment described, the voltage is 7 at a speed of 0 knots and 10 volts at a speed of 12 knots with a linear relationship between speed and voltage. The voltage is then passed to a voltage-to-frequency converter 9 to produce an output frequency in line 11 which is directly proportional to the input voltage and thus to the speed. The voltage-to-frequency converter is described in detail and claimed in the co-pending application, cited above, and will therefore not be described in detail. A voltage controlled oscillator is employed which is driven by an operational amplifier with a feedback circuit to provide a linear relationship between input voltage and output frequency. This frequency can now be divided by divider 13 by a factor of 40960 so that each pulse represents a distance of 0.1 nautical miles. These pulses are now stored in a 4 place accumulator 15 which has binary coded 1, 2, 4, and 8 outputs for each place, only one of which is shown connected as at 17.

Output 17 is connected to AND gate 19 and the output of the AND gate 19 is connected through line 21 to a decoder indicator 23. The other input of AND gate 19 is connected through line 25 to a single pole double throw switch 27, the central terminal of which is grounded. Thus, if line 25 is gounded, gate 19 is opened to interrogate accumulator 15 and therefore the decoder indicators 23 display the distance traveled. If line 25 is not grounded, it receives a positive bias from line 26 which keeps gate 19 closed.

Figure 2:
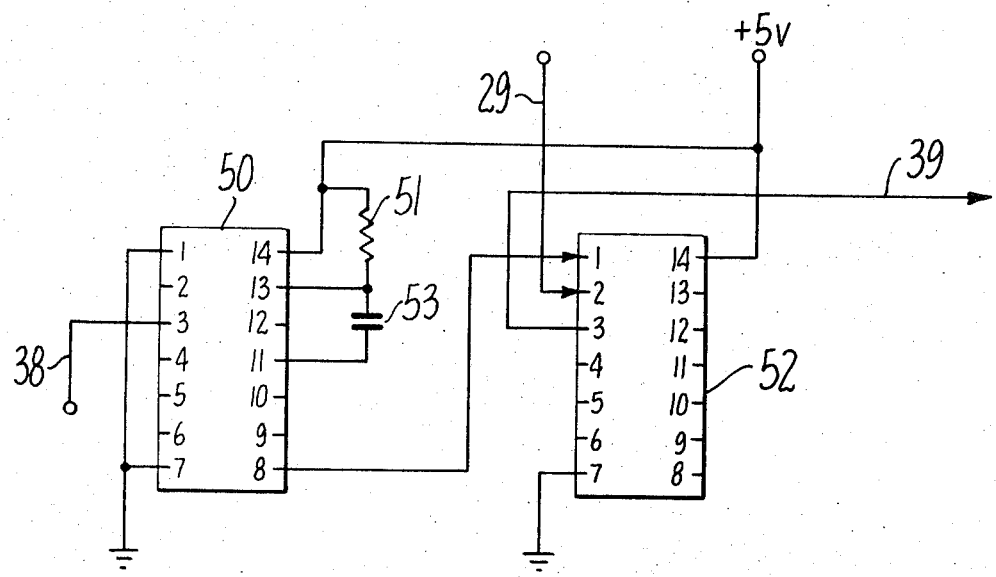
FIG. 2 is a detailed schematic of a suitable monostable multivibrator and AND gate.

Output from the frequency converter 9 is also taken through line 29 to an AND gate 31. The other terminal 33 of the AND gate is connected to a monostable multivibrator which, in this case, has a pulse train length of 0.88 seconds. The multivibrator 35 is periodically triggerred by an astable multivibrator 37. The output from the AND gate 31 is taken through line 39 to a four digit accumulator 41 which may be the same type as the accumulator 15. The operation is such that at suitable intervals such as 1.5 to 2 seconds the astable multivibrator 37 pulses the monostable multivibrator 35 and this opens the AND gate 31 for a period of 0.88 seconds. During this open period, accumulator 41 counts the pulses and accumulates them and, with the factors given, a period of 0.88 seconds and a pulse rate of 1,364 Hz will give a value of 1,200 pulses in the accumulator 41 representing a speed of 12 knots. At the time the astable multivibrator 37 pulses the monostable multivibrator, it also sends a clearing pulse through line 43 to the accumulator. Thus, the accumulator is always up to date within two seconds since it is being set back to 0 and counting pulses at approximately 2 second intervals. Obviously multivibrator 35 must have a very accurate period, while the period of 37 is not important to accuracy. A suitable monostable multivibrator is shown in FIG. 2.

Only one of the 16 accumulator outputs of 41 is shown at 45 and this is passed to AND gate 47 and the other input of AND gate 47 is connected to line 49 to switch 27. Now if one moves the switch from the position shown to the bottom position, line 49 will be grounded, closing gate 19 and opening gate 47 so that accumulator 41 will now be interrogated and the output through line 21 to decoder-indicator 23 will display speed.

It will be understood that it is necessary to employ 32 AND gates only, two of which are illustrated at 19 and 47. The AND gates will be connected in pairs so that 16 of the AND gate inputs will be connected to the 16 outputs of accumulator 15 while the other 16 AND gates will have their inputs connected to the outputs of accumulator 41.

In one practical embodiment of the invention, accumulators 15 and 41 each consisted of four Motorola MC838P while the decoder indicators 23 consisted of four Datecon D103. The 32 AND gates as at 19 and 21 consisted of eight quad Paks Fairchild 949.

In FIG. 2 a suitable circuit is shown for the monostable multivibrator 35 and the AND gate 31. Here unit 50 is a Fairchild 9601 retriggerable monostable multivibrator. The period is determined by resistor 51 and capacitor 53 but the monostable multivibrator time constant is not RC but defined as $$T = 0.32 \text{ RC } (1 + 0.07/R).$$

Because of the device characteristics it is best to determine R and C empirically to achieve the required time constant of 0.88 second.

Unit 52 is a Fairchild 949 Quad gate, only one of the four available gates being employed. The multivibrator 50 is triggered through line 38 and the output through line 39 is as previously described, namely, a series of gated pulses.

Figure 3:
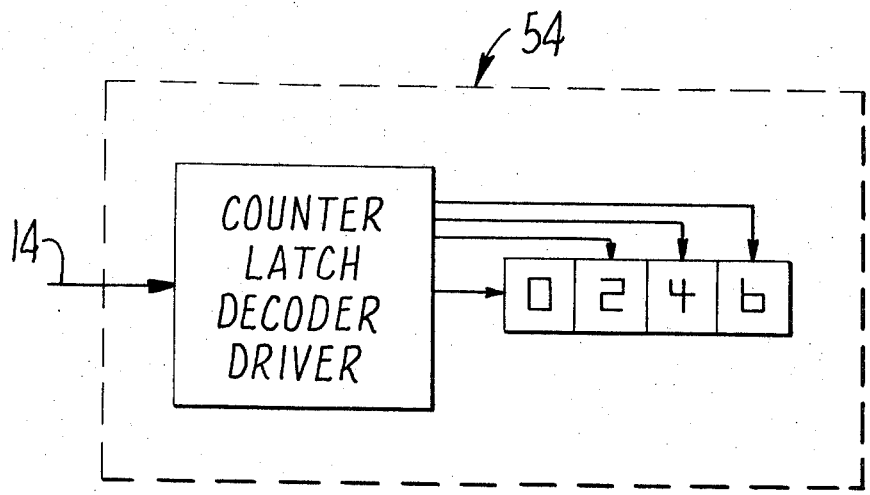
FIG. 3 is an alternate form of readout.

The accumulator and decoder-indicator setup previously described is relatively expensive and these can be replaced with a much less expensive unit as is shown in FIG. 3. Here line 14 which comes off of the divider is fed into unit 54 which includes a Motorola MC4050 counter latch decoder-driver unit which actuates a four digit incandescent display, each of which has seven segments. Although this unit is shown for replacing the log portion of the device it can also be used for the speed indicator by feeding the output from line 39 into such a device. In fact, these units are so expensive that separate log and speed readouts are preferred rather than using the switchable readout of FIG. 1.

We claim:

1. A combined digital readout speedometer and log comprising in combination:
   a. a voltage sensor having a D.C. voltage output proportional to the speed of a vessel,
   b. means for converting said voltage to a frequency wherein said frequency is directly proportional to speed,
   c. means for taking a first output from said voltage converter to a divider and first accumulator wherein a count is accumulated in said first accumulator representing distance,
   d. means for taking a second output from said voltage converter and sampling said frequency for a precise period of time and accumulating said count in a second accumulator wherein said count represents speed,
   e. means to selectively interrogate said distance and speed counts in said first and second accumulators comprising a plurality of pairs of electronic AND gates connected to the outputs of said first and second accumulators and a switchable biasing means operatively connected to each AND gate of said pairs of electronic AND gates to selectively enable certain AND gates to interrogate said outputs of said accumulators, and
   f. a single digital display means connected to the outputs of said pairs of electronic AND gates, said single digital display means for said first and second outputs employed to indicate both distance and speed.

2. The speedometer and log of claim 1 wherein the sampling means of paragraph (d) is a monostable multivibrator.

* * * * *